July 8, 1924.

F. S. MORTON

BALL BEARING HEAD

Filed April 27, 1923

1,500,516

Inventor:
Fred S. Morton
By *Southgate & Southgate*
Attorneys

Patented July 8, 1924.

1,500,516

UNITED STATES PATENT OFFICE.

FRED S. MORTON, OF WORCESTER, MASSACHUSETTS.

BALL-BEARING HEAD.

Application filed April 27, 1923. Serial No. 635,172.

*To all whom it may concern:*

Be it known that I, FRED S. MORTON, a citizen of the United States, residing at Worcester, in the county of Worcester and State of Massachusetts, have invented a new and useful Ball-Bearing Head, of which the following is a specification.

The principal object of this invention is to provide an anti-friction bearing for the end of a roll or hub with means whereby the same can be inserted in the end of the roll and there will be no danger of the roll crowding up on it and thereby binding the wheel or perhaps getting loose from the head in the opposite end, and to provide for accomplishing this in a simple manner by means which enable the device to be made by die pressing operations.

Reference is to be had to the accompanying drawings in which

Figure 1:
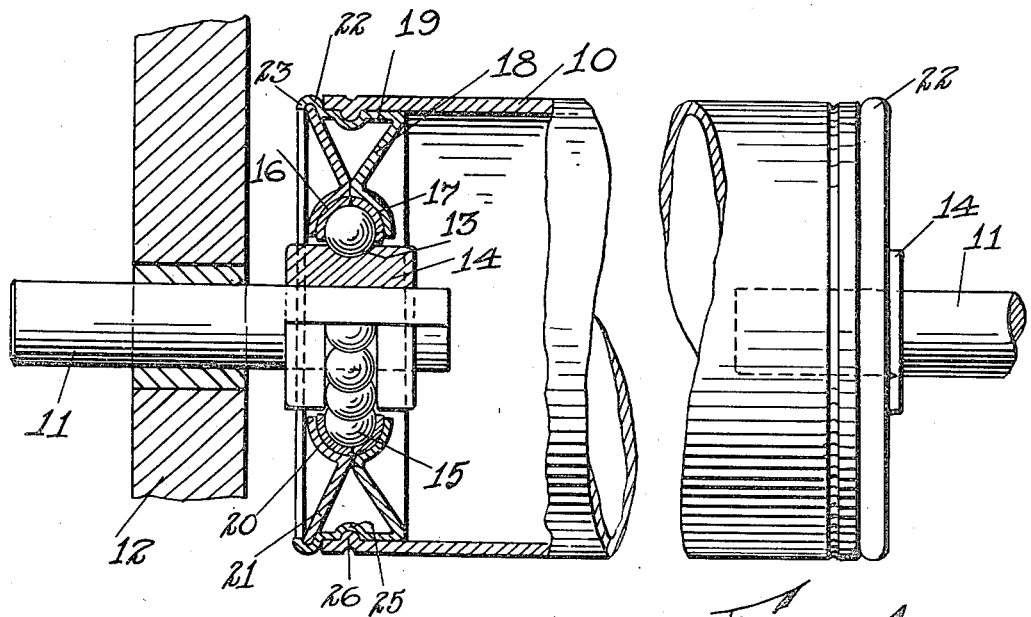
Figure 2:
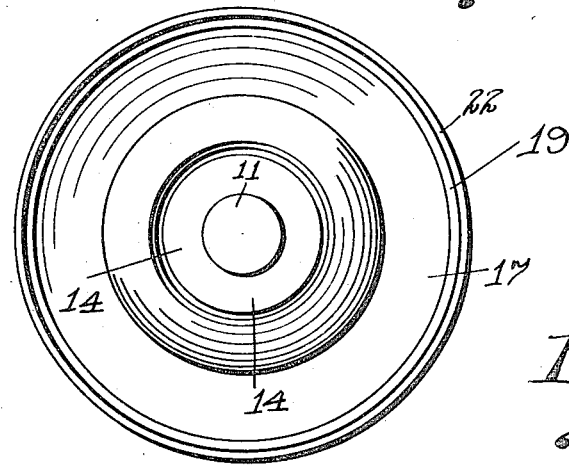

Fig. 1 is a side view of a roll to which this invention is applied and showing the head in central sectional view; and Fig. 2 is an end view of the head.

The invention is shown applied to a roll 10 in the form of a pipe or hollow cylinder of any character adapted to be supported by two shafts or studs 11 mounted in fixed bearings on frames 12. Ordinarily these rolls are placed near enough together to support articles which are to be passed over them and constitute easily rotatable surfaces for receiving these articles and passing them along. This invention, however, is not limited to rolls used for that particular purpose.

For the purpose of this invention, each of the shafts is provided with a ball groove 13 either made on the shaft or preferably on a hub 14 adapted to be secured thereto. These grooves are designed to receive bearing balls 15 in their races 16.

The roll head is formed of two pieces of sheet metal pressed up in dies. One of these pieces has a circular convex inner edge 17 fitting half the ball race and provided with an outwardly flaring conical web 18 and then is bent inwardly to form a cylindrical outer wall 19. The other one is provided with a similar convex inner edge 20 and a flaring outer wall 21 of conical shape which terminates in a circular edge.

The end of the cylindrical wall 19 is bent outwardly at 22 to form a shoulder there. This is a circumferential abrupt shoulder, the purpose of which will appear, and as originally made the wall extends outwardly from this shoulder in a cylindrical shape a slight distance. This cylindrical shape is not shown on the drawings because when the parts are assembled this edge is turned down to form a curved edge 23 which binds the edge of the wall 21 under it.

This, therefore, serves two purposes. It finishes the shoulder 22 in an abrupt character against which the end of the roll 10 is adapted to engage and prevents the head from becoming dislodged from the roll endwise. It also incidentally furnishes a groove inside for receiving the edge of the flange 21 and the edge 23 being turned over into contact with the latter it thoroughly anchors this part of the head to the other part.

I also prefer to provide a circumferential groove 25 in the cylindrical wall 19 preferably centrally located therein. This is formed by bending inwardly, not changing the thickness of the metal. When the roll 10 is put in position with its edge in contact with the shoulder 22, it is rolled or spun down to form an inwardly extending projection 26 entering the groove 25 and thus further assisting in holding the parts against relative longitudinal motion.

This furnishes a simple and inexpensive means for securing an antifriction bearing in the end of the roll or hub and preventing disengagement of the same from the roll at each end. The parts are of a simple nature and are simply made by die pressing operations and assembled in a simple and inexpensive manner.

Although I have illustrated and described only a single form of the invention and shown it as applied to a roll, I am aware of the fact that modifications can be made therein by any person skilled in the art and that it can be applied to other articles than rolls, as for example wheel hubs, without departing from the scope of the invention as expressed in the claims. Therefore I do not wish to be limited to all the details of construction herein shown and described, but what I do claim is:—

1. As an article of manufacture, a conveyor roll comprising a pipe or tube having open ends and provided with a head in the end thereof having ball bearings and provided with a cylindrical outer surface and two opposite webs inside this cylindrical surface, the said cylindrical wall having an outwardly extending shoulder at one end for engaging and limiting the position of the roll on the head, one of said webs having an integral cylindrical wall beyond it at its circumference provided with an abrupt shoulder near the end of the cylindrical surface, with a circular groove under the shoulder for receiving the edge of the opposite web and being bent down around the last named edge to firmly hold the two parts together, said cylindrical wall also being provided with a circumferential groove for receiving a projection extending inwardly from the pipe or tube.

2. As an article of manufacture, a conveyor roll comprising a pipe or tube having open ends and provided with a head in the end thereof having ball bearings and provided with a cylindrical outer surface and two opposite conical webs inside this cylindrical surface, one of which is integral with the wall on which the cylindrical surface is located, and the other of which is separate from it, the said cylindrical wall having an outwardly extending shoulder at one end for engaging and limiting the position of the roll on the head and a circumferential extension beyond it for receiving under it the outer edge of the other conical web and the extension being bent down around the edge of said web and outside the end of the roll or tube to hold the two parts of the head firmly together.

3. As an article of manufacture, a bearing head consisting of a ball bearing cage and two separate sheet metal parts, each having a convex portion for receiving a part of the ball cage and each provided with a conical web extending outwardly from the same and diverging from each other, one of said webs having an integral cylindrical wall beyond it provided with an abrupt shoulder near its end, a circular groove under the shoulder for receiving the edge of the opposite web, and being bent down around the last named edge to firmly hold the two parts together, the outer cylindrical surface being adapted to receive the inside of a roll or hub thereon and the shoulder constituting a stop for the end of the roll or hub.

In testimony whereof I have hereunto affixed my signature.

FRED S. MORTON.